(12) United States Patent
Satou et al.

(10) Patent No.: US 6,505,814 B1
(45) Date of Patent: Jan. 14, 2003

(54) FLUID CONTROLLER

(75) Inventors: Jyunji Satou, Osaka (JP); Hisatoshi Akamoto, Osaka (JP); Makoto Iwata, Osaka (JP)

(73) Assignee: Kabushiki Kaisha Fujikin, Osaka (JP)

( * ) Notice: Subject to any disclaimer, the term of this patent is extended or adjusted under 35 U.S.C. 154(b) by 0 days.

(21) Appl. No.: 09/807,548

(22) PCT Filed: Aug. 23, 1999

(86) PCT No.: PCT/JP99/04544
§ 371 (c)(1),
(2), (4) Date: Apr. 12, 2001

(87) PCT Pub. No.: WO00/22326
PCT Pub. Date: Apr. 20, 2000

(30) Foreign Application Priority Data

Oct. 15, 1998 (JP) ........................................... 10-293958

(51) Int. Cl.⁷ ................................................ F16K 1/00
(52) U.S. Cl. ..................... 251/331; 251/335.2; 137/863
(58) Field of Search ............................. 251/331, 335.2; 137/863

(56) References Cited

U.S. PATENT DOCUMENTS

| | | | | |
|---|---|---|---|---|
| 2,705,124 A | * | 3/1955 | Price et al. | 251/331 |
| 2,918,089 A | * | 12/1959 | McFarland, Jr. | 251/331 |
| 2,988,322 A | * | 6/1961 | Anderson | 251/331 |
| 3,011,758 A | * | 12/1961 | McFarland, Jr. | 251/331 |
| 3,020,020 A | * | 2/1962 | Boteler | 251/331 |
| 3,130,954 A | * | 4/1964 | McFarland, Jr. | 251/331 |
| 3,148,861 A | * | 9/1964 | McFarland, Jr. | 251/331 |
| 3,154,286 A | * | 10/1964 | McFarland, Jr. | 251/331 |
| 4,029,296 A | * | 6/1977 | Hartmann et al. | 251/331 |
| 4,901,751 A | * | 2/1990 | Story et al. | 251/331 |
| 4,955,582 A | * | 9/1990 | Baumann | 251/331 |
| 5,222,523 A | * | 6/1993 | Trimble | 137/863 |
| 6,095,484 A | * | 8/2000 | Frenkel | 251/331 |

FOREIGN PATENT DOCUMENTS

JP         07139650 A    * 11/1993

* cited by examiner

Primary Examiner—Henry C. Yuen
Assistant Examiner—John Bastianelli
(74) Attorney, Agent, or Firm—Cislo & Thomas LLP

(57) ABSTRACT

A fluid controller (1), having a valve body (4) having flow paths used as inlet and outlet for a bonnet (5), and an operating mechanism (7) moving the diaphragm in vertical direction, wherein the flow paths of the valve body communicates with each other through a protrusion-free communication path (8), the diaphragm is fitted closely to the communication path when lowered so as to close the flow path and, when raised, the center part of the diaphragm is recessed and its part near the outer periphery part is protruded, and also a curved surface (52) to which the outer upper surface (63) of the protruded part is closely fitted is formed on the bonnet at the inner lower surface of a diaphragm holding part (51).

5 Claims, 16 Drawing Sheets

PRIOR ART

US 6,505,814 B1

FLUID CONTROLLER

FIELD OF THE INVENTION

This invention is related to a fluid controller, and its object is to provide the fluid controller that is superior in processability, whereof branch plumbing is easy and puddle never occurs in flow paths.

BACKGROUND ART

As a fluid controller used as usual, one with the structure shown in FIG. 22 is exemplified.

The fluid controller in FIG. 22 comprises a valve body C having an inlet flow path A and an outlet flow path B, a diaphragm D, a bonnet E holding fixedly periphery part of the diaphragm and an operation mechanism G moving the diaphragm in vertical direction, wherein the diaphragm D is contacted and separated to a valve base F by operating operation mechanism G so that the inlet flow path A and the outlet flow path B becomes closure state or communication state.

In the conventional fluid controller as shown in FIG. 22, however, the center processing for a cave, i.e. the inlet flow path A, the outlet flow path B and the valve body C must be accurate well adjusted when processing the flow paths so that processability was very poor because the valve base F is provided as a protrusion between the inlet flow path A and the outlet flow path B are curved and are opened at the surface of valve body C.

Also, there is a problem whereof the puddle of fluid is easy to occur inside the plumbing because flow paths are curved at the portion of the valve base F.

Moreover, in case of using this fluid controller with carrying out welding and the like as a branch valve, the processability is very poor because disposal to lean a body to the diagonal direction and so on is required.

For prior art invented in order to solve said problem, there is the invention disclosed in Japan tokukaihei 1-320378, for example.

The invention disclosed in Japan tokukaihei 1-320378 comprises that an inlet flow path and an outlet flow path which are arranged on the identical axis line, these inlet flow path and outlet flow path are connected with a communication path where it has no protrusion, wherein a diaphragm is contacted and separated to the inside under the communication path.

Since the inlet flow path and the outlet flow path which are arranged on the identical axis line are connected with the communication path where it has no protrusion, this invention disclosed is superior in the processability of the flow path compared with a conventional fluid controller and moreover puddle of fluid inside of the plumbing is hard to occur because there is no curve on flow paths. However, when adjusting to correspondence for the center of the diaphragm and a center of width direction of communication flow path is not carried out accurately, the flow path could not be surely closed down so that the accurate adjusting work was required.

On the other hand, for plumbing such as a pipeline system, a T-letter shaped fluid controller showing in plan view having a main path and the branch path at right angles to this main path is often used with connecting the plumbing in order to sample fluid.

In the fluid controller having a conventional branch path, however, when using the branch path substantially horizontally and the main path downward, the puddle is occurred at the bump and it becomes the cause such as propagation of the miscellaneous germs since bump exists on communication surface from the branch path to the seal base, so it is not preferable.

For prior art invented in order to solve said problem, there is the invention disclosed in Japan Patent No.2591876 (PCT/GB91/01025).

The invention disclosed in Japan Patent No.2591876 (PCT/GB91/01025) comprises a T-letter shaped fluid controller showing in plan view, wherein communication surface from the branch path to the seal base becomes horizontal or inclined to the main path when directing the branch path substantially horizontally and the main path downward By the above invention, an occurrence of the puddle by the bump was prevented since there is no bump which used to exist; however, the processability is very bad and it is difficult to disappear bump completely.

This invention is for solving the above problem, and tries to provide the fluid controller which can achieve both prevention of occurrence of puddle in the flow path and good processability.

DISCLOSURE OF THE INVENTION

The invention relates to a fluid controller comprising: a valve body having flow paths used as inlet and outlet for fluid: a diaphragm held fixedly between the valve body and a bonnet; and an operation mechanism moving the diaphragm in vertical direction, wherein said flow paths of the valve body communicate with each other through a protrusion-free communication path, said diaphragm is fitted closely to the communication path when lowered so as to close the flow path and when raised, the center part of the diaphragm is recessed and its part near the outer periphery part is protruded, and a curved surface to which an outer surface of said protruded part is closely fitted is formed on said bonnet at the inner lower surface of a diaphragm holding part.

The invention relates to a fluid controller wherein said flow paths provided on the valve body are comprised an inlet flow path and an outlet flow path which are arranged on the identical axis line.

The invention relates to a fluid controller wherein said flow path provided on a valve body is a T-letter shaped flow path comprising a penetration flow path penetrating the valve body and a branch flow path branched from the penetration flow path and a bottom surface of the penetration flow path exists at the same level as a bottom surface of the communication path.

The invention relates to a fluid controller wherein said flow path provided on a valve body is a T-letter shaped flow path comprising a penetration flow path penetrating the valve body and a branch flow path branched from the penetration flow path, the penetration flow path is where a central axis line thereof is positioned below a bottom of said communication path, and a communication surface from the penetration flow path to the communication path is formed as an inclination horizontally or downward when the penetration flow path is arranged horizontally and the branch flow path is arranged downward.

The invention relates to a fluid controller wherein the diameter of said penetration flow path is larger than the diameter of the branch flow path.

THE BEST EMBODIMENT FOR THE INVENTION

Figure 1:
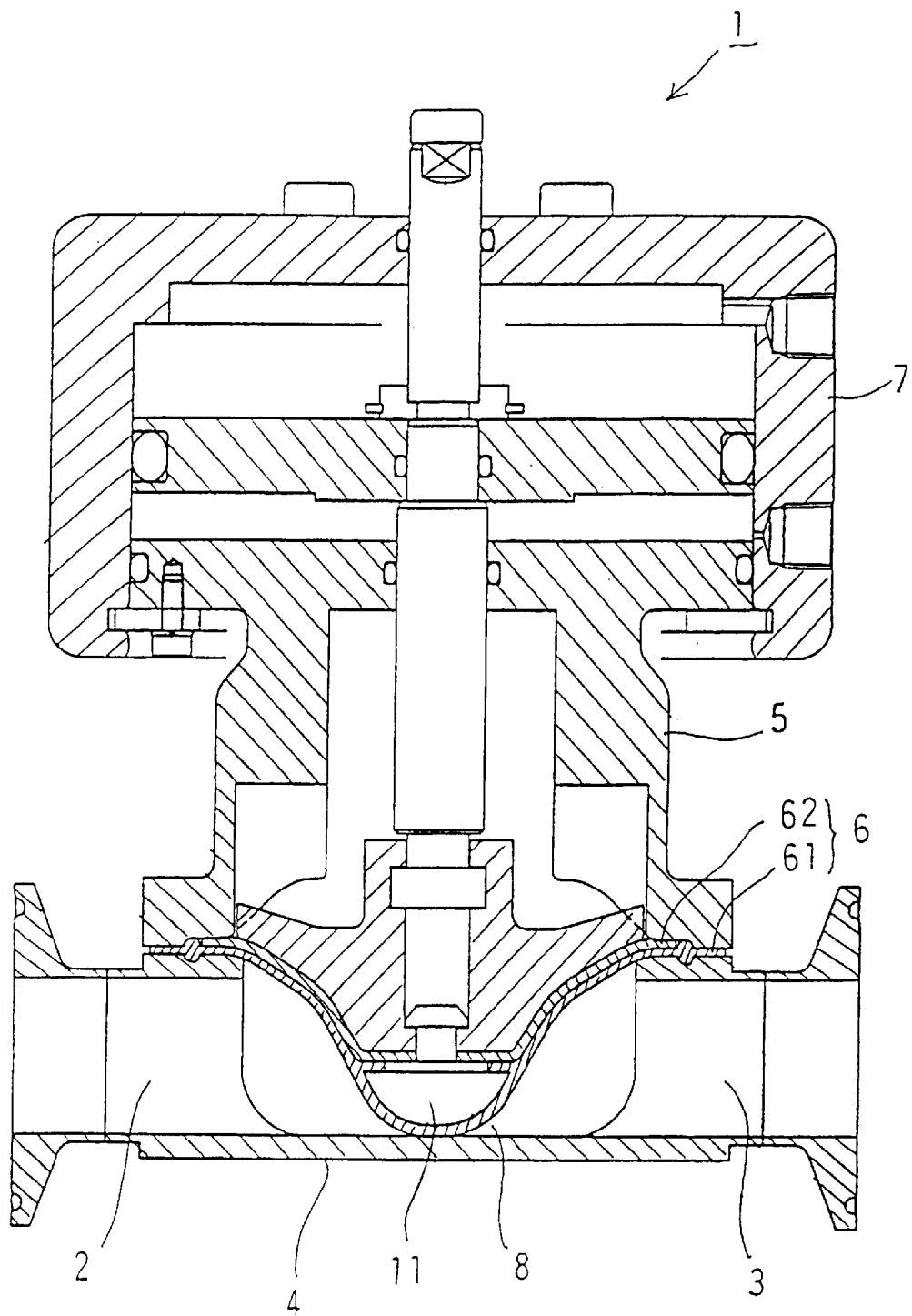
FIG. 1 is a sectional view showing the 1st embodiment in the fluid controller related to the present invention.

Hereinafter, preferable embodiments for the fluid controller related to the present invention are explained based on the drawing.

Figure 2:
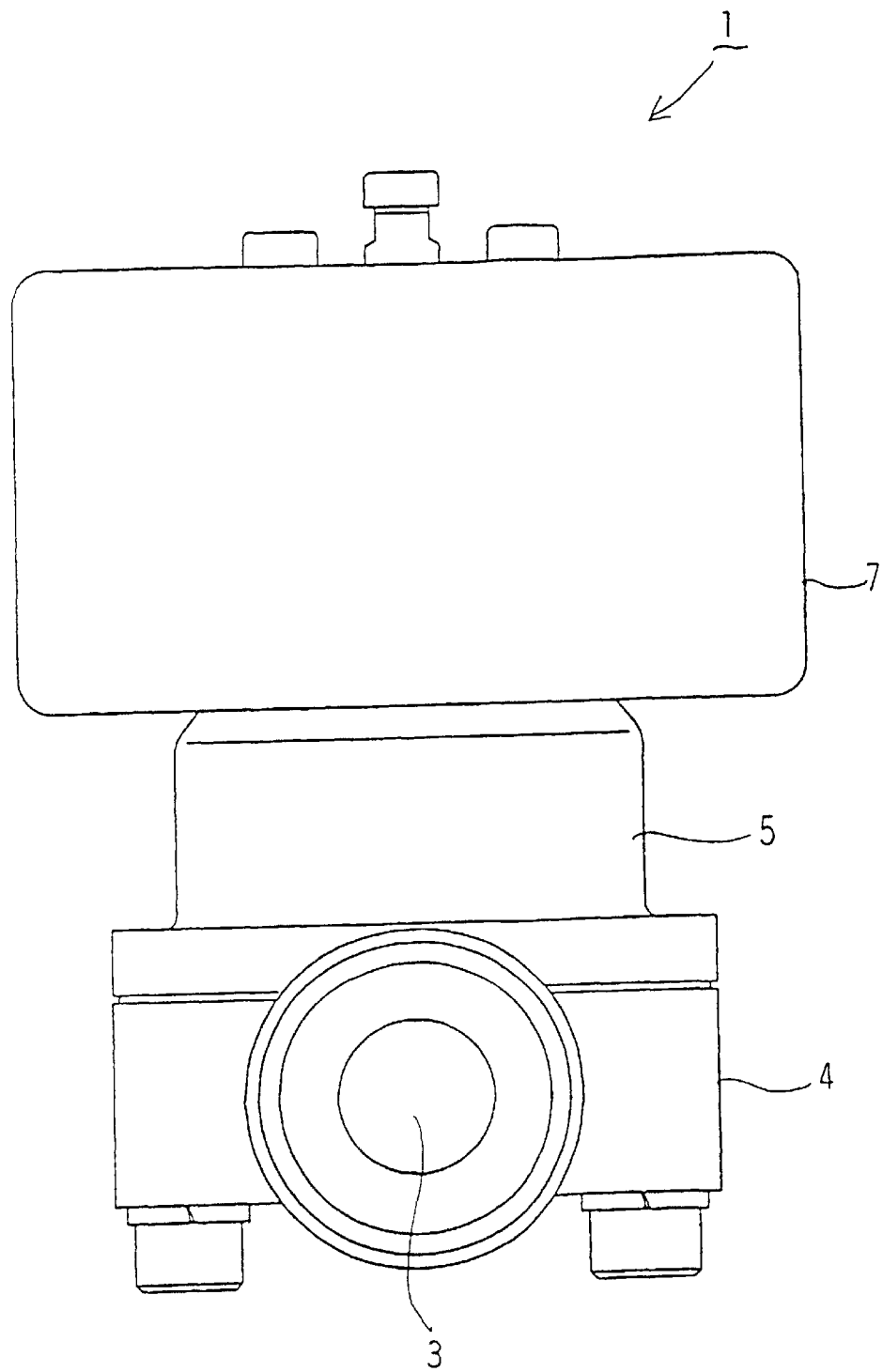
FIG. 2 is a side view of FIG. 1.

FIG. 1 is a sectional view showing the 1st embodiment in the fluid controller related to the present invention and FIG. 2 is its side view.

The fluid controller 1 related to the 1st embodiment comprises: a valve body 4 having a inlet flow path 2 and an outlet flow path 3; a diaphragm 6 held fixedly between upper surface of the valve body 4 and the lower surface of a bonnet 5; and an operation mechanism 7 moving the diaphragm 6 in vertical direction.

The inlet flow path 2 and the outlet flow path 3 are arranged on the identical axis line as shown in FIGS. and the inlet flow path 2 and the outlet flow path 3 communicate with each other through a protrusion-free communication path 8.

In the fluid controller 1 related to the 1st embodiment, since the inlet flow path 2 and the outlet flow path 3 communicate with each other through the protrusion-free communication path 8 as the above, puddle never occurs in the flow paths.

Figure 3:
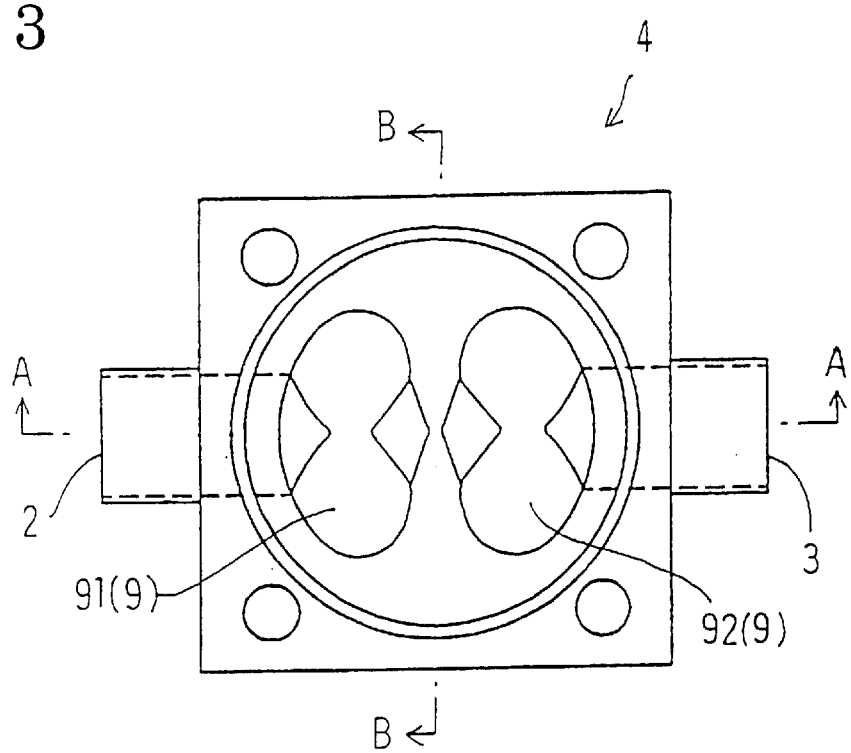
FIG. 3 is a plan view showing the 1st implementation form of the valve body of the fluid controller related to the 1st embodiment.
Figure 4:
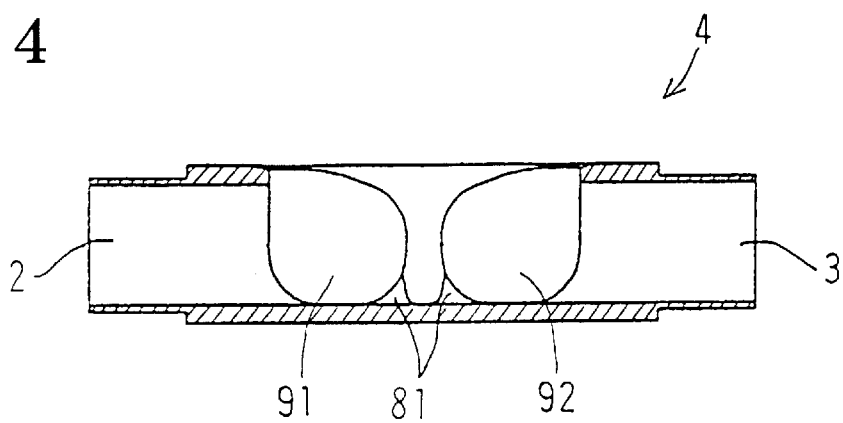
FIG. 4 is a sectional view for an A—A line in FIG. 3.
Figure 5:
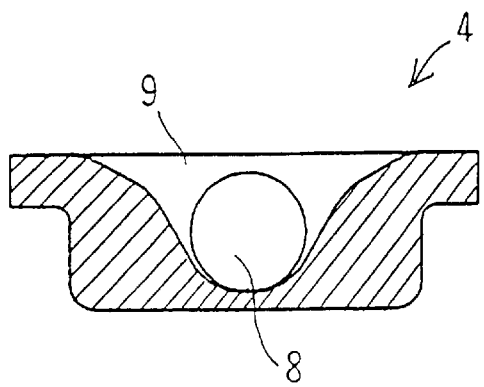
FIG. 5 is a sectional view for a B—B line in FIG. 3.

FIG. 3 is a plan view showing the 1st implementation form of the valve body 4 of the fluid controller 1 related to the 1st embodiment, FIG. 4 is a sectional view for an A—A line in FIG. 3 and FIG. 5 is a sectional view for a B—B line in FIG. 3.

Figure 6:
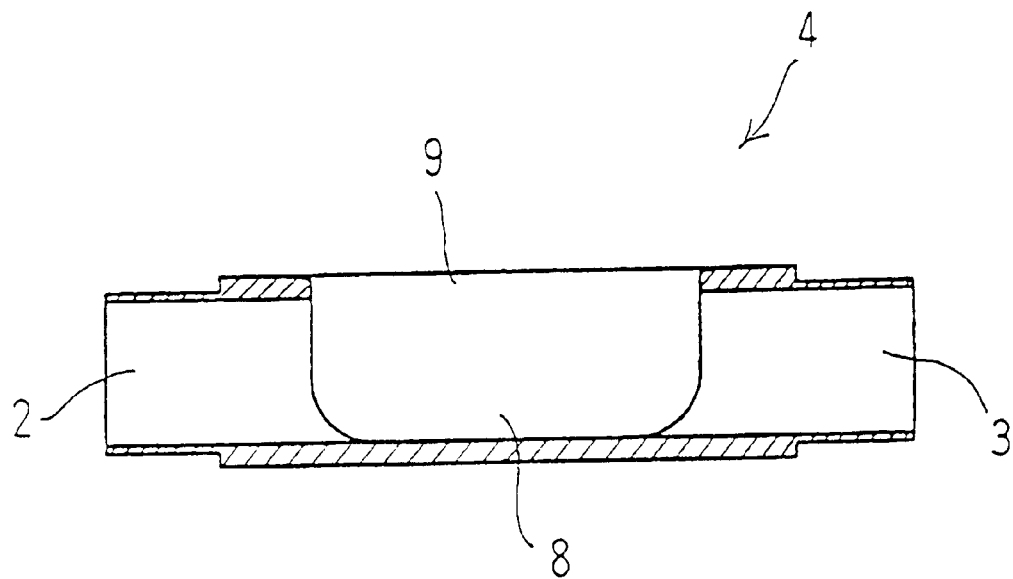
FIG. 6 is a sectional view showing the 2nd implementation form of the valve body.
Figure 7:
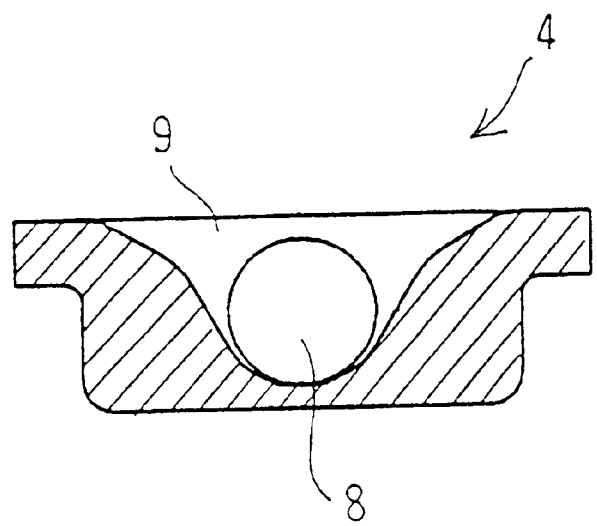
FIG. 7 is a sectional view showing the 2nd implementation form of the valve body.
Figure 8:
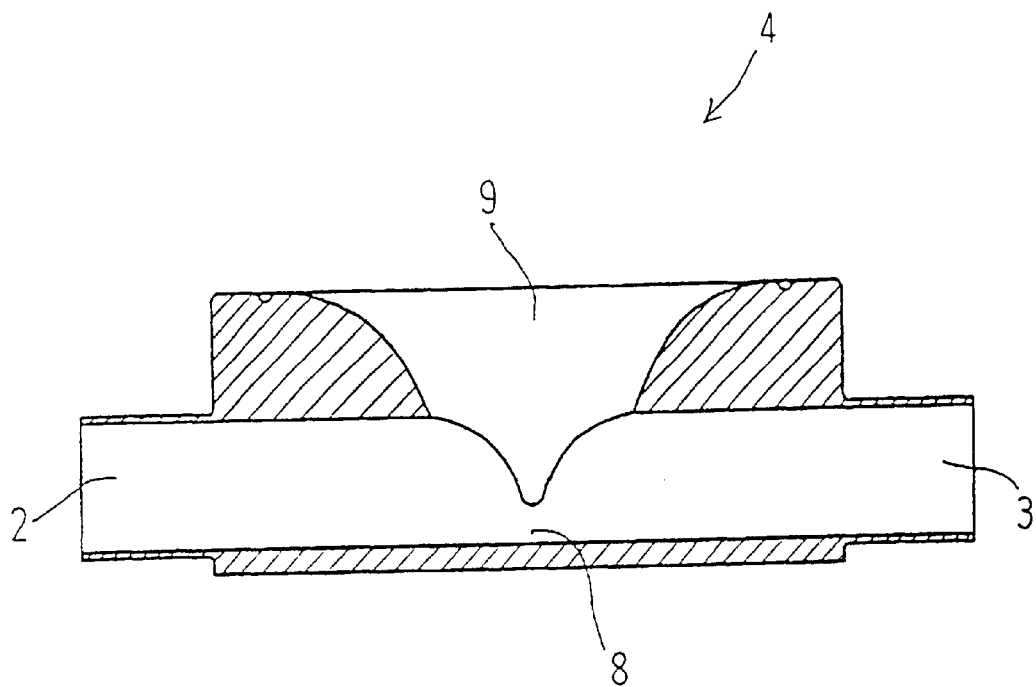
FIG. 8 is a sectional view showing the 3rd implementation form of the valve body.
Figure 9:
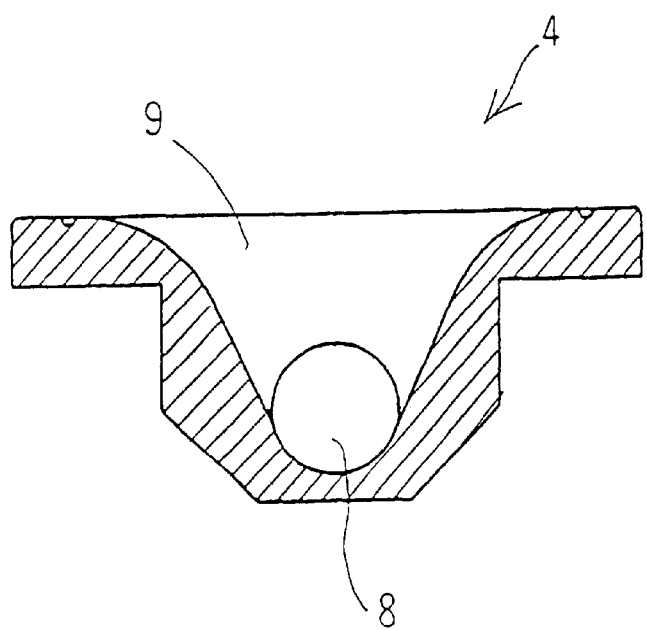
FIG. 9 is a sectional view showing the 3rd implementation form of the valve body.

FIG. 6 and FIG. 7 are sectional views showing the 2nd implementation form of the valve body 4, FIG. 8 and FIG. 9 are sectional views showing the 3rd implementation form of the valve body 4, and FIG. 6, FIG. 8 and FIG. 7, FIG. 9 show equivalent parts of the sectional view in FIG. 4 and equivalent parts of the sectional view in FIG. 5, respectively.

These valve bodies 4 related to the 1st to the 3rd implementation form have the same points on that the inlet flow path 2 and the outlet flow path 3 are arranged on the identical axis line and the inlet flow path 2 and outlet flow path 3 communicate with each other through a protrusion-free communication path 8; however, shape of holes which are disposed from upper surface of the body to the inlet flow path 2 and the outlet flow path 3 is different.

That is, in the valve body 4 related to the 1st implementation form, a little bump exists, on inside surface of the flow path in the upper part of the body as shown in FIG. 4, between a hole on the inlet flow path side 91 and a hole on the outlet flow path side 92, which are holes 9 disposed from upper surface of the body in the direction of the inlet flow path 2 and the outlet flow path 3, and it seems the form which separated into a hole on the inlet flow path side 91 and a hole on the outlet flow path side 92 in the plan view of the body as shown in FIG. 3.

FIG. 4 shows the portion of an identical surface with the inside surface of the inlet flow path 2 and the outlet flow path 3, which is on the inside surface of communication path 8, as mark 81.

Moreover, in the valve body 4 related to the 2nd and 3rd implementation form, since the hole 9 disposed from upper surface of the body in the direction of the inlet flow path 2 and the outlet flow path 3 forms a whole hole which has no bump on the inside surface of the flow paths on the upper part of the body as shown in FIG. 6 and FIG. 8, a hole on the inlet flow path side and the hole on the outlet flow path side are seen as one in the plan view.

In the 2nd implementation form, the hole 9 is disposed substantially perpendicularly from upper surface of the body in the direction of the inlet flow path 2 and the outlet flow path 3, with width in the direction of the flow path is substantially equal and as reaching to an inside of lower surface of the communication path 8 (See FIG. 6). In the 3rd implementation form, the hole 9 is disposed from upper surface of the body in the direction of the inlet flow path 2 and the outlet flow path 3, with gradually reducing width in the direction of the flow path (See FIG. 8).

In any of these valve body 4, it is superior in processability very much and branch plumbing is easy to be carried out since a processing for a cave, i.e. the inlet flow path 2 and outlet flow path 3 and a center processing for valve body 4 can be worked independently.

Figure 10:
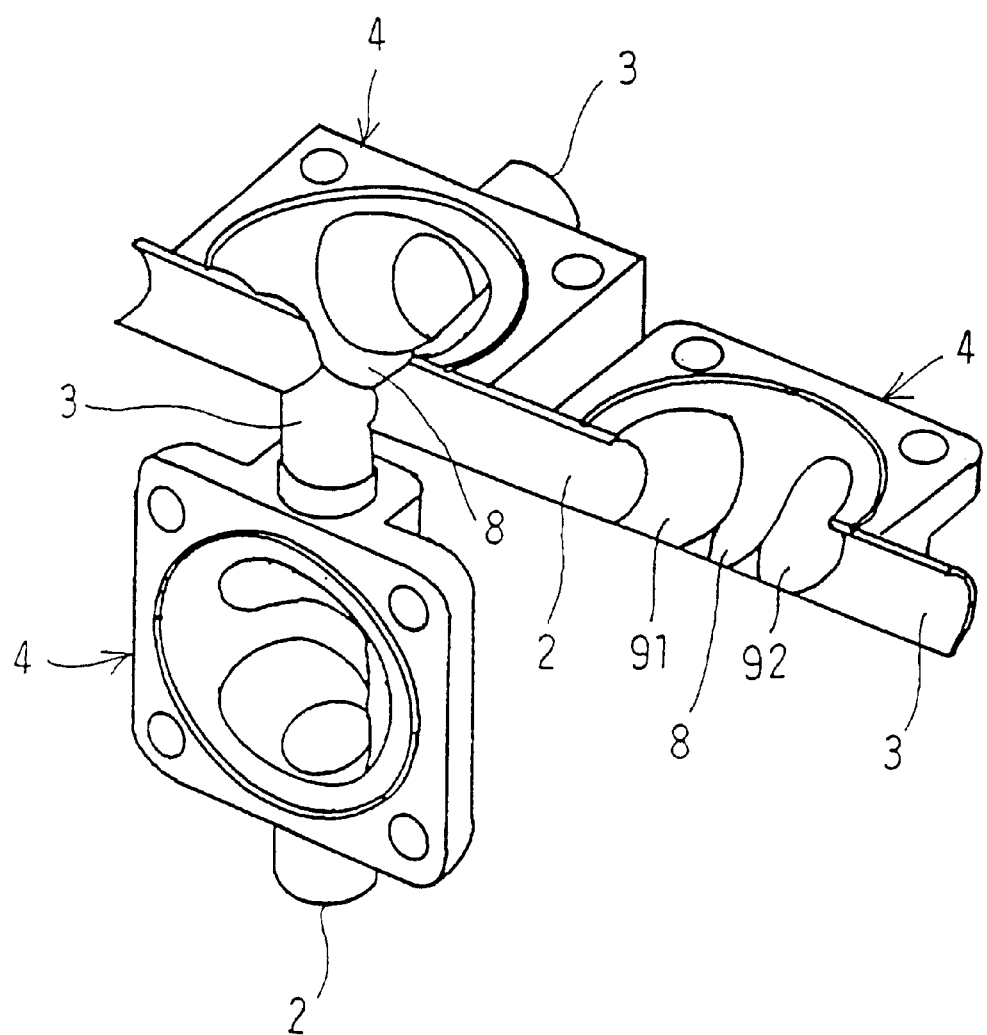
FIG. 10 is a view showing the case when the fluid controller related to the present invention is used as a branch valve.

FIG. 10 is a view showing the case when the fluid controller 1 related to the present invention is used as a branch valve. Incidentally, only valve body 4 is shown in the FIG.

In the fluid controller 1 related to the present invention, since a inlet flow path 2 and an outlet flow path 3 are arranged on the identical axis line and the inlet flow path 2 and outlet flow path 3 communicate with each other through a protrusion-free communication path 8, the perpendicular plumbing without leaning a body is possible by penetrating downward the inlet flow path side 91 or the hole on the outlet flow path side 92 as it is and the horizontal plumbing without leaning a body is possible by penetrating the inlet flow path side 91 or the hole on the outlet flow path side 92 horizontally as it is, as shown in Fig, so that it is superior in the weld work-ability on the branch plumbing.

Figure 11:
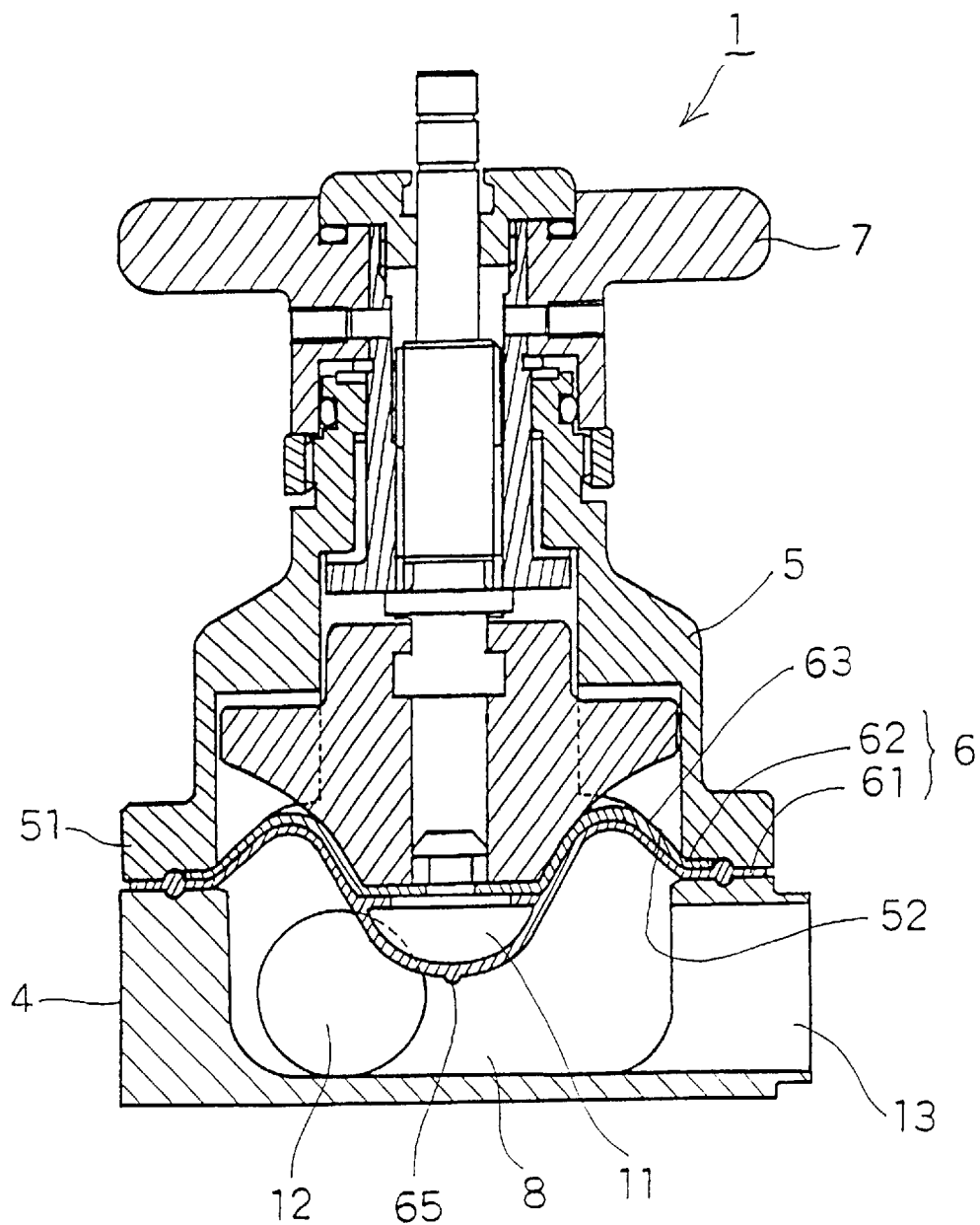
FIG. 11 is a sectional view showing the 2nd embodiment of the fluid controller related to the present invention.
Figure 12:
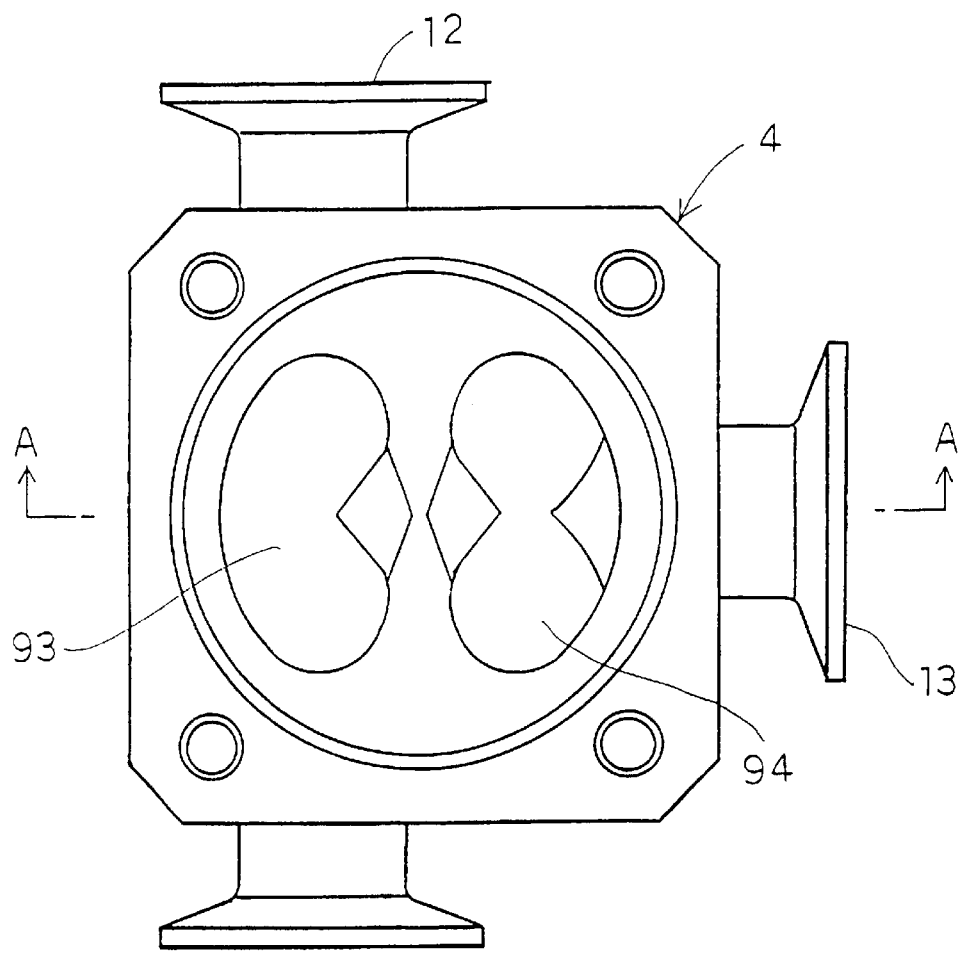
FIG. 12 is a plan view of the valve body of the fluid controller related to the 2nd embodiment.
Figure 13:
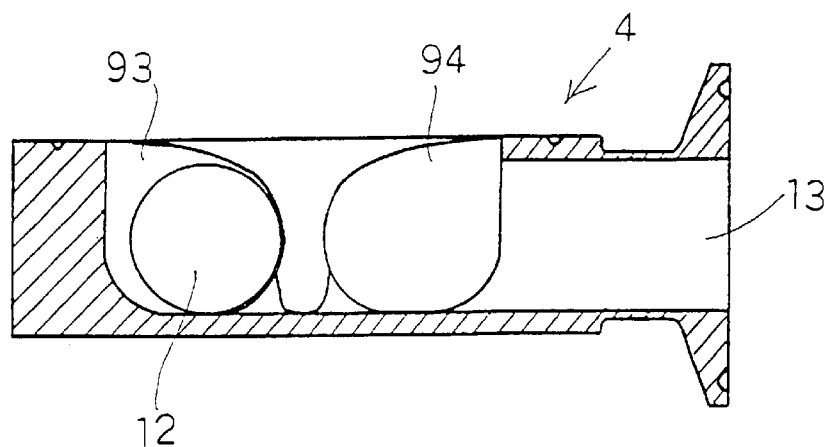
FIG. 13 is a sectional view for an A—A line in FIG. 12.

FIG. 11 is a sectional view showing the 2nd embodiment of the fluid controller related to the present invention, FIG. 12 is a plan view of the valve body of the fluid controller related to the 2nd embodiment and FIG. 13 is a sectional view for an A—A line in FIG. 12.

The fluid controller 1 related to the 2nd embodiment comprises: a valve body 4 having flow paths used as inlet and outlet for fluid; a diaphragm 6 held fixedly between upper surface of the valve body 4 and the lower surface of a bonnet 5; and an operation mechanism 7 moving the diaphragm 6 in vertical direction.

The difference point in the fluid controller 1 related to the 2nd embodiment from the one in the 1st embodiment is the flow path provided on a valve body 4, which is the T-letter shaped flow path comprising a penetration flow path 12 penetrating the valve body 4 and a branch flow path 13 branched from said penetration flow path 12.

The penetration flow path 12 and the branch flow path 13 communicate with each other through a protrusion-free communication path 8, and by the above, occurrence of puddle in the flow paths is prevented completely.

Further, the inside diameter of the penetration flow path 12 and the branch flow path 13 is the same diameter, and a bottom surface of the penetration flow path 12 exists at the same level as a bottom surface of the communication path 8 as shown in FIG. 11. Also, the penetration flow path 12 is provided as that the inside surface thereof on a side of the branch flow path 13 is located to the position tilted a little in the opposite direction of the branch flow path 13 from the center of valve body 4.

Incidentally, mark 93 in the FIG. is a hole from the upper surface of the valve body 4 to the penetration flow path 12, and mark 94 is a hole from the upper surface of valve body 4 to the branch flow path 13.

In the fluid controller 1 related to the 2nd embodiment, it is also superior in processability very much since a processing for the penetration flow path 12 and the branch flow path 13 and a center processing for valve body 4 can be worked independently.

Figure 14:
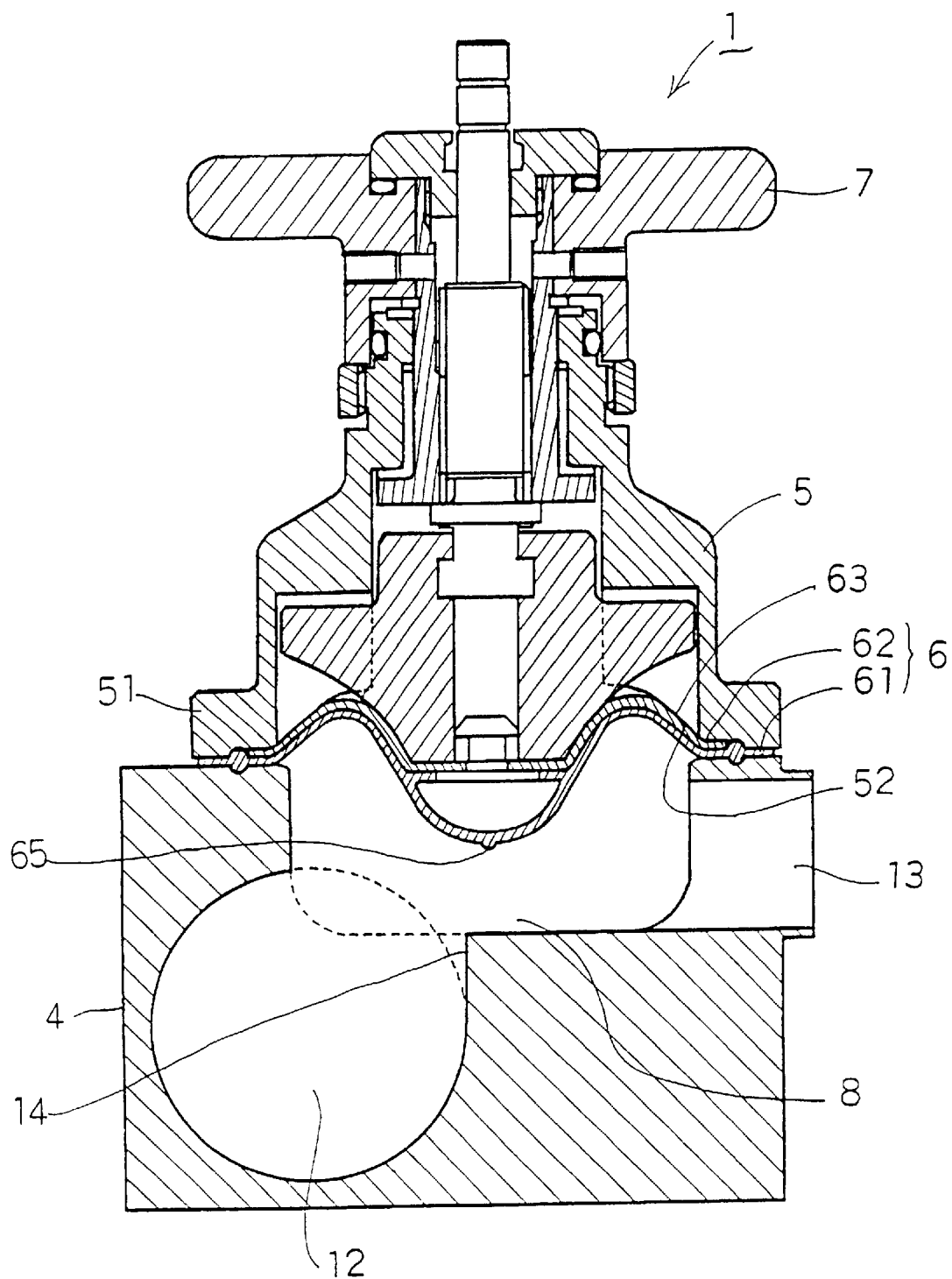
FIG. 14 is a sectional view showing the 3rd embodiment of the fluid controller related to the present invention.
Figure 15:
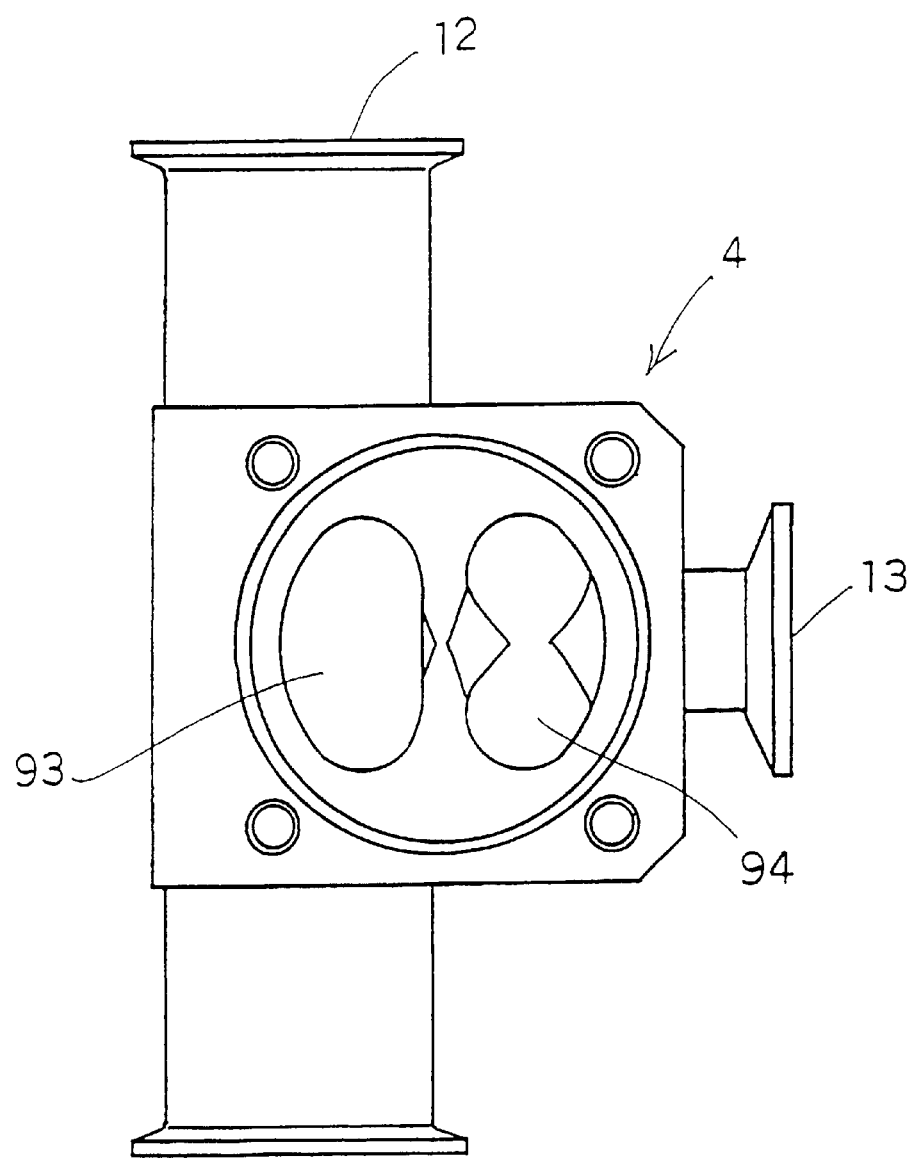
FIG. 15 is a plan view of the valve body of the fluid controller related to the 3rd embodiment.

FIG. 14 is a sectional view showing the 3rd embodiment of the fluid controller related to the present invention and FIG. 15 is a plan view of the valve body of the fluid controller related to the 3rd embodiment.

The fluid controller 1 related to the 3rd embodiment comprises: a valve body 4 having flow paths used as inlet and outlet for fluid; a diaphragm 6 held fixedly between upper surface of the valve body 4 and the lower surface of a bonnet 5; and an operation mechanism 7 moving the diaphragm 6 in vertical direction.

The fluid controller 1 related to the 3rd embodiment, as same as the one in the 2nd embodiment, the flow path provided on a valve body 4 is a penetration flow path 12 penetrating the valve body 4 and a branch flow path 13 branched from said penetration flow path 12, and the penetration flow path 12 and the branch flow path 13 communicate with each other through a protrusion-free communication path 8.

The penetration flow path 12 is provided as that the inside surface thereof on a side of the branch flow path 13 is located to the position tilted a little in the opposite direction of the branch flow path 13 from the center of valve body 4.

The difference points in the fluid controller 1 related to the 3rd embodiment from the one in the 2nd embodiment are that the diameter of penetration flow path 12 is about twice the large size of the diameter of branch flow path 13 and the penetration flow path 12 is where a central axis line thereof is positioned below the bottom of the communication path 8.

A communication surface 14 from the penetration flow path 12 to the communication path 8 is formed as an inclination horizontally or downward when the penetration flow path 12 is arranged horizontally and the branch flow path 13 is arranged downward.

Therefore, with the composition whereof the penetration flow path 12 and the branch flow path 13 communicate with each other through the protrusion-free communication path 8, occurrence of puddle in the flow paths is prevented completely when the penetration flow path 12 is arranged horizontally and the branch flow path 13 is arranged downward.

Incidentally, mark 93 in the FIG. is a hole from the upper surface of the valve body 4 to the penetration flow path 12, and mark 94 is a hole from the upper surface of valve body 4 to the branch flow path 13.

In the fluid controller 1 related to the 3rd embodiment, it is also superior in processability very much since a processing for the penetration flow path 12 and the branch flow path 13 and a center processing for valve body 4 can be worked independently.

Figure 16:
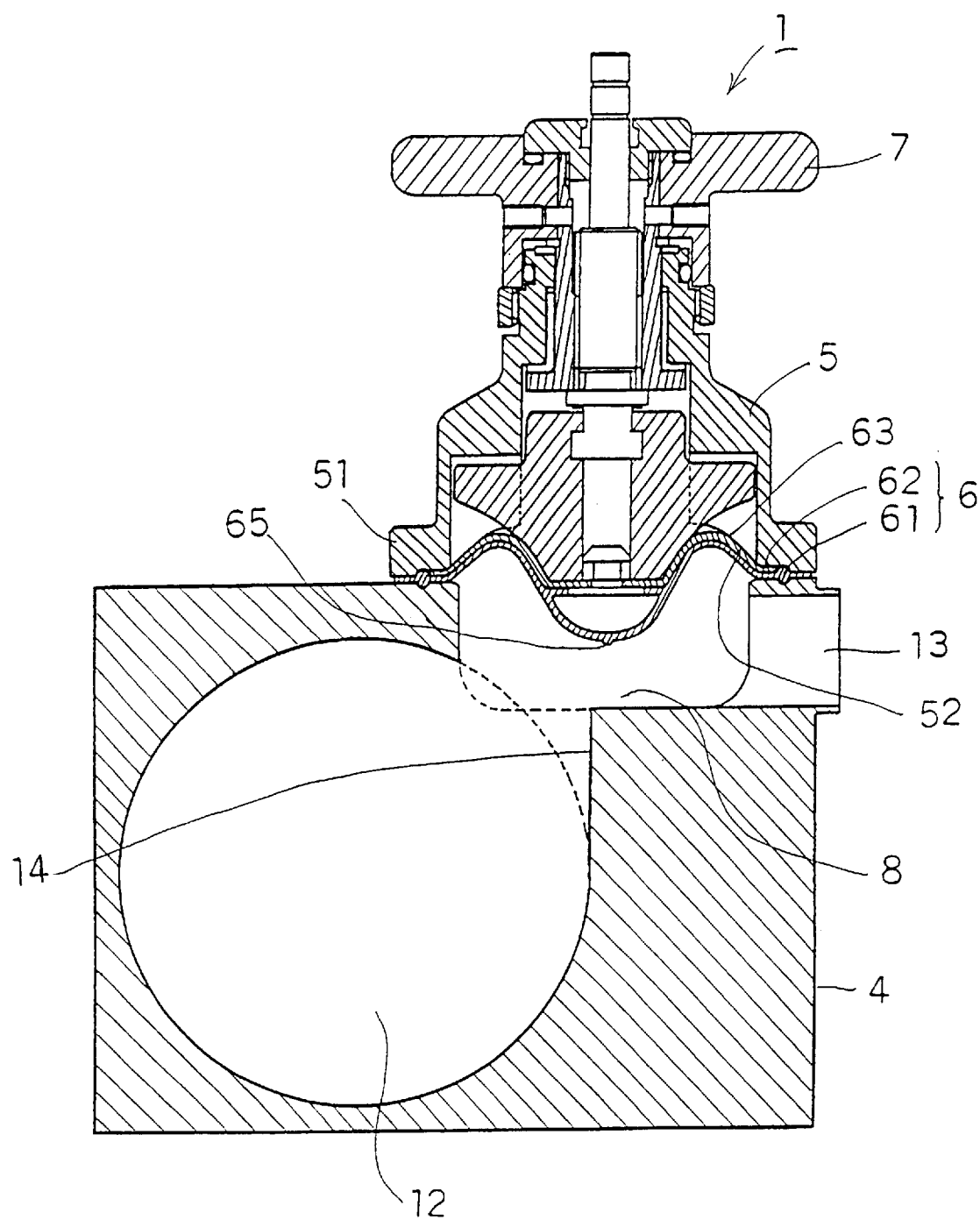
FIG. 16 is a sectional view showing the 4th embodiment of the fluid controller related to the present invention.
Figure 17:
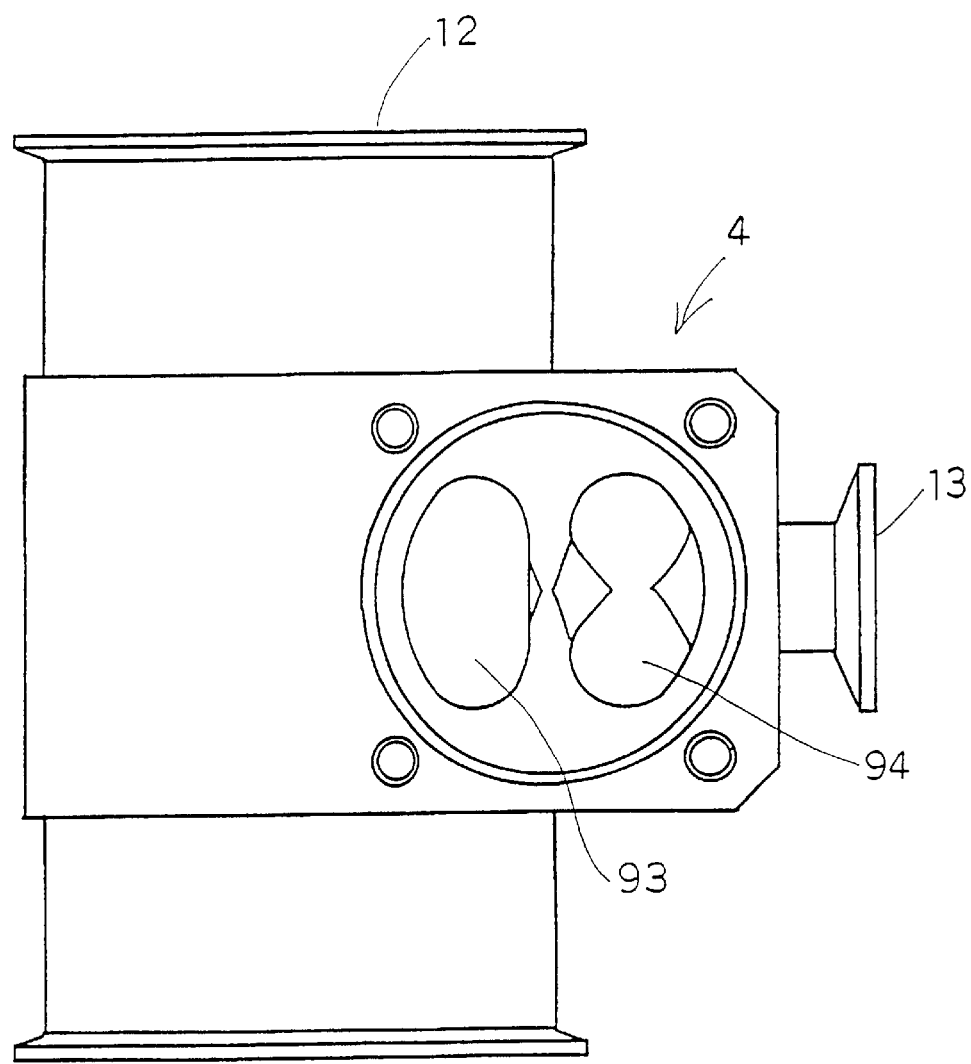
FIG. 17 is a plan view of the valve body of the fluid controller related to the 4th embodiment.

FIG. 16 is a sectional view showing the 4th embodiment of the fluid controller related to the present invention and FIG. 17 is a plan view of the valve body of the fluid controller related to the 4th embodiment.

The fluid controller 1 related to the 4th embodiment comprises: a valve body 4 having flow paths used as inlet and outlet for fluid; a diaphragm 6 held fixedly between upper surface of the valve body 4 and the lower surface of a bonnet 5; and an operation mechanism 7 moving the diaphragm 6 in vertical direction.

The fluid controller 1 related to the 4th embodiment, as same as the one in the 2nd embodiment, the flow path provided on a valve body 4 is a T-letter shaped flow path comprising a penetration flow path 12 penetrating the valve body 4 and a branch flow path 13 branched from said penetration flow path 12, and the penetration flow path 12 and the branch flow path 13 communicate with each other through a protrusion-free communication path 8.

The penetration flow path 12 is provided as that the inside surface thereof on a side of the branch flow path 13 is located to the position tilted a little in the opposite direction of the branch flow path 13 from the center of valve body 4.

The difference points in the fluid controller 1 related to the 4th embodiment from the one in the 2nd embodiment are that the diameter of penetration flow path 12 is about from four to five times the large size of the diameter of branch flow path 13 and the penetration flow path 12 is where a central axis line thereof is positioned below the bottom of the communication path 8.

Communication surface 14 from the penetration flow path 12 to the communication path 8 is formed as an inclination horizontally or downward when the penetration flow path 12 is arranged horizontally and the branch flow path 13 is arranged downward, as same as the 3rd embodiment.

Also in the fluid controller 1 related to the 4th embodiment, therefore, with the composition whereof the penetration flow path 12 and the branch flow path 13 communicate with each other through the protrusion-free communication path 8, occurrence of puddle in the flow paths is prevented completely when the penetration flow path 12 is arranged horizontally and the branch flow path 13 is arranged downward.

Incidentally, mark 93 in the FIG. is a hole from the upper surface of the valve body 4 to the penetration flow path 12, and mark 94 is a hole from the upper surface of valve body 4 to the branch flow path 13.

In the fluid controller 1 related to the 4th embodiment, it is also superior in processability very much since a processing for the penetration flow path 12 and the branch flow path 13 and a center processing for valve body 4 can be worked independently.

In the fluid controller 1 (from the 1st to the 4th embodiment) related to the present invention as descried above, the diaphragm 6 have double layered structure comprised a lower part diaphragm 61 which a tip of hanging lug 11 is buried and an upper part diaphragm 62 provided with sticking to an upper surface of the lower part diaphragm 61.

For the lower part diaphragm 61, a synthetic resin film made of polytetrafluoroethylene (PTFE) and the like is preferably used, and for the upper part diaphragm 62, a rubber film made of synthetic rubber, such as natural rubber, nitrile rubber, styrene rubber, fluoric rubber (FPM), and ethylene propylene rubber (EPDM), is preferably used.

Figure 18:
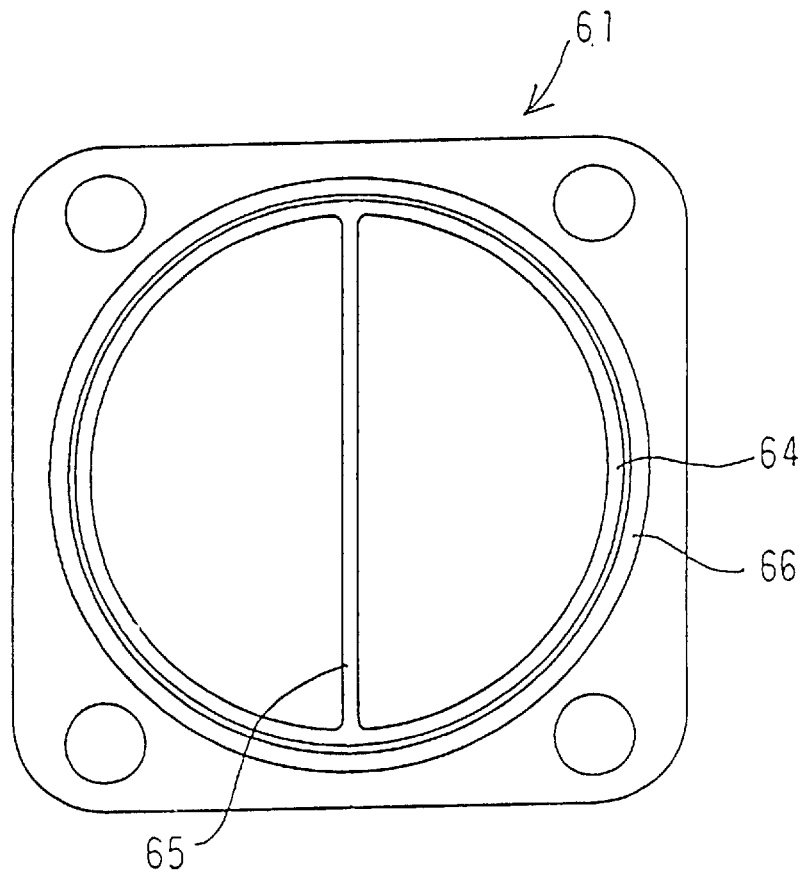
FIG. 18 is a bottom plan view of the lower part of diaphragm in the fluid controller related to the present invention.
Figure 19:
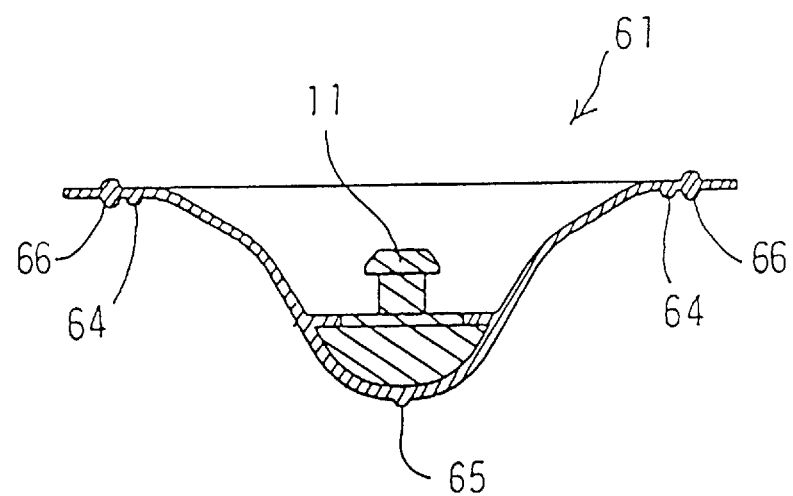
FIG. 19 is a sectional view of the lower part of diaphragm.
Figure 20:
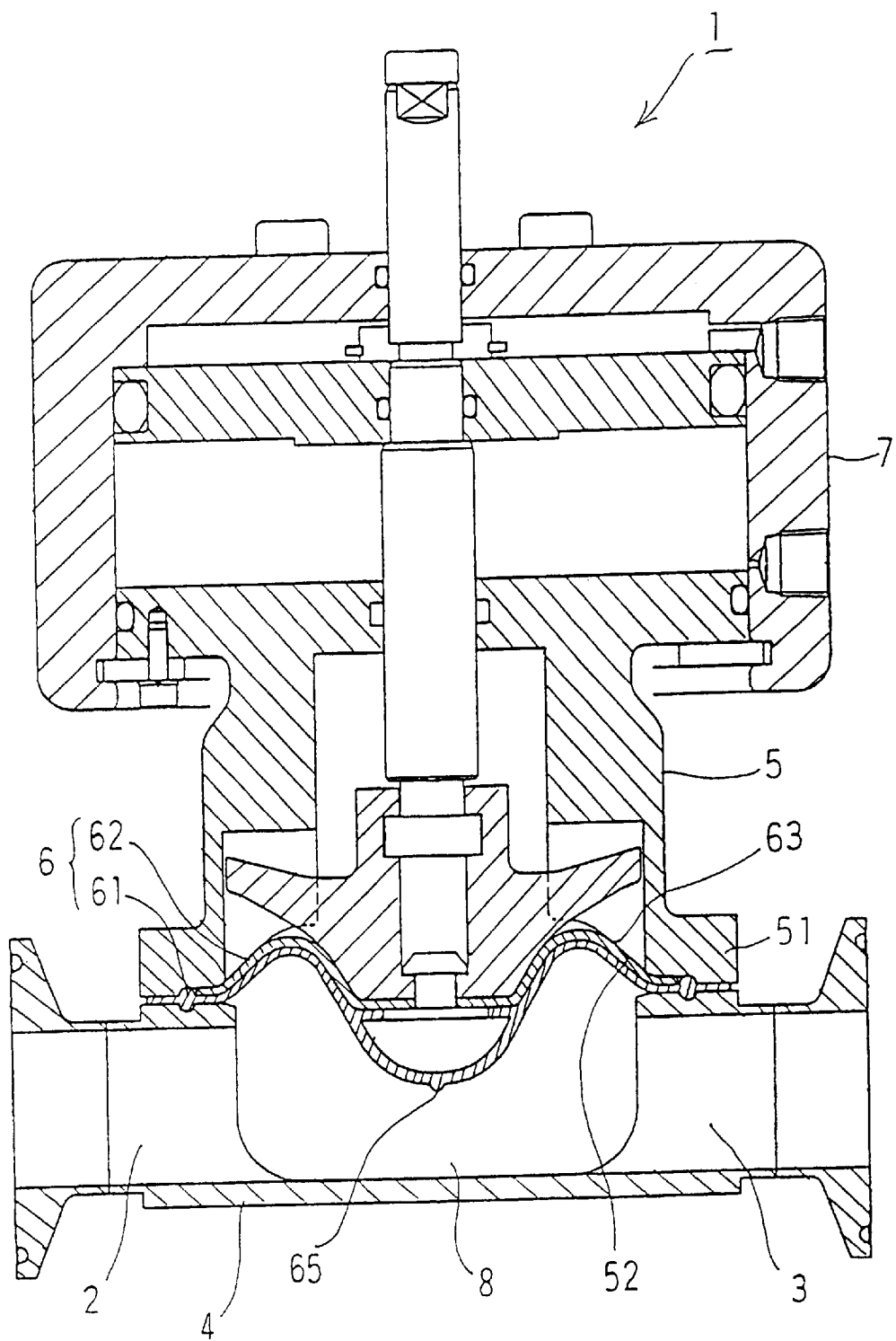
FIG. 20 is a sectional view showing the condition whereof the diaphragm in the fluid controller of the 1st embodiment is raised.

FIG. 18 is a bottom plan view of the lower part of diaphragm and FIG. 19 is a sectional view thereof.

As shown in FIGS., annular ridges, which comprised outside annular ridge 63 and inside annular ridge 64, near the periphery part of the lower part diaphragm 61 and longitudinal ridge 65 which runs the inside annular ridge 64 longitudinally are formed.

As shown in the FIG. 1 and the like, the outside annular ridge 63 plays a role to hold the lower part diaphragm 61 fixedly between the valve body 4 and the bonnet 5, and the inside annular ridge 64 plays a role to hold the upper side diaphragm 62 fixedly at the place under the lower surface of bonnet 5.

Moreover, the longitudinal ridge 65 plays a role whereof the lower surface of lower part diaphragm 61 is fitted closely to the communication path 8 surely and the flow path is closed when diaphragm 6 lowers.

The diaphragm 6, when it lowers, closes the flow path by fitting closely the lower surface of lower part diaphragm 61 to the communication path 8 as shown in FIG. 1.

Further, when diaphragm 6 rises to open the flow path, a center part of the diaphragm is recessed and its part near the outer periphery part is protruded so that it shows as M-letter shape in a sectional view as shown in FIG. 11, FIG. 14, FIG. 16 and FIG. 20. At this time, an outer upper surface 63 of the diaphragm protruded part fits closely to a curved surface 52 that is formed at inner (a central axial direction) lower surface of a diaphragm holding part 51 of the bonnet 5.

As the above, by composing that the outer upper surface of the diaphragm protruded part fits closely to the curved surface which is formed at the inner lower surface of a diaphragm holding part of the bonnet when the diaphragm rises, it is possible adjusting to correspondence for the valve body 4 and the bonnet 5 easily very much with spending short time when producing, and it is hard to occur gap when assembling.

Figure 21:
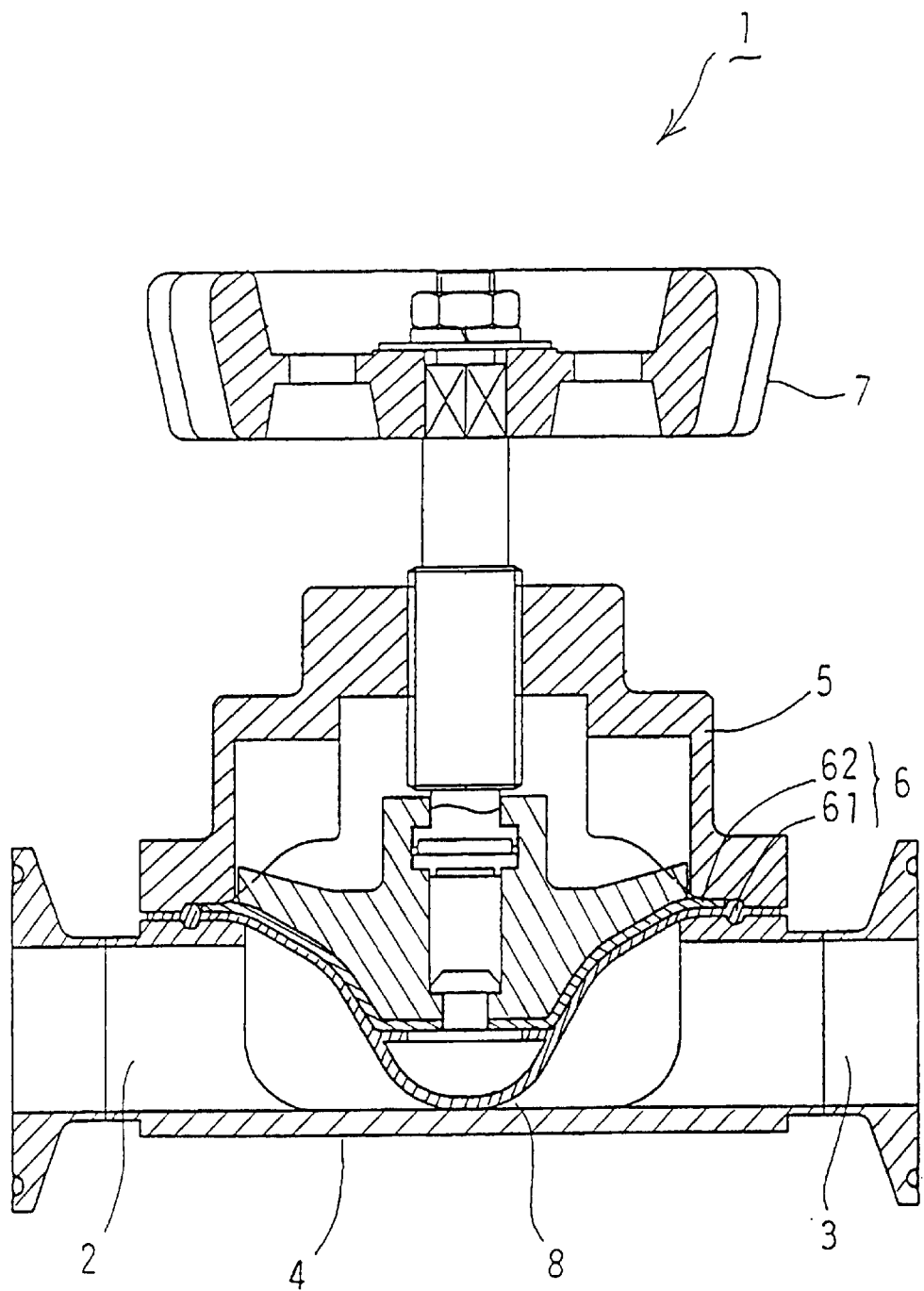
FIG. 21 is a sectional view showing another implementation form of the fluid controller related to the present invention and FIG. 22 is a sectional view showing an example of the conventional fluid controller.
Figure 22:
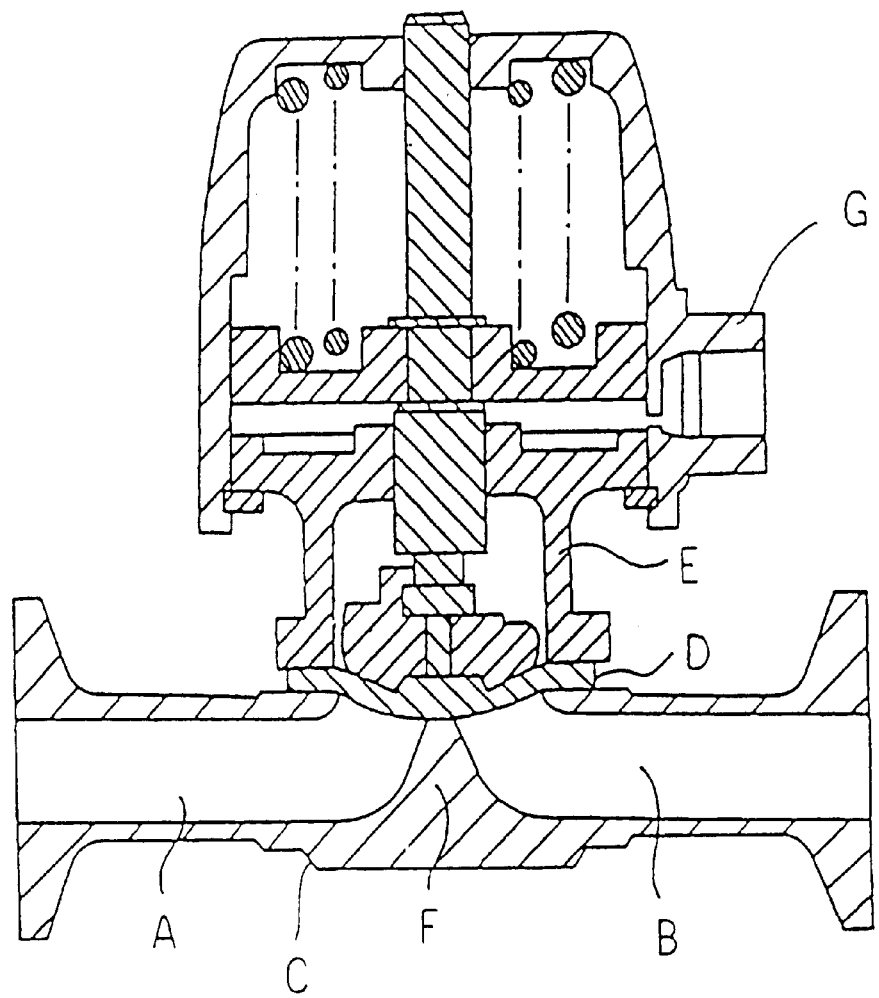

Incidentally, in the fluid controller 1 related to the present invention, the operation mechanism 7 moving diaphragm 6 in vertical direction is not restricted especially, but it can be air pressure operated system using a compressor as shown in FIG. 1 and manual operated system as shown in FIG. 11 and FIG. 21. Also, other operated system, which is well known, can be used appropriately.

THE AVAILABILITY ON THE INDUSTRY

As described above, the fluid controller related to the present invention can be preferably used for sampling plumbing at the cultivation equipment of the microorganism, supplying liquid plumbing and the like because puddle never occurs in the flow path and it is superior in cleaning-ability in the pipe.

What is claimed is:
1. A fluid controller (1), comprising:
   a valve body (4) having flow paths used as inlet and outlet for fluid;
   a diaphragm (6) held fixedly between the valve body and a bonnet (5);
   and an operation mechanism (7) moving the diaphragm in a vertical direction,
   wherein said flow paths of the valve body communicate with each other through a communication path (8) and that does not have any protrusions and that is not curved at a valve base, said diaphragm is fitted closely to the communication path when lowered so as to close the flow path and when raised, the center part of the diaphragm is recessed and its part near the outer periphery part is protruded, a curved surface (52) to which an outer upper surface (63) of said protruded part is closely fitted is formed on said bonnet at the inner lower surface of a diaphragm holding part (51), the diaphragm having double layered structure comprising a lower part diaphragm (61) which a tip of hanging lug (11) is buried and an upper part diaphragm (62) sticking to an upper surface of the lower part diaphragm, and annular ridges, which comprise an outside annular ridge (66) and inside annular ridge (64) near the periphery part of the lower part diaphragm; and a lower longitudinal ridge (65) which runs inside the inside annular ridge (64) longitudinally;

said annular ridges ridged in both the upper and lower directions, an outer periphery part of the upper part diaphragm being inside more than an inner surface of the outside annular ridge.

2. The fluid controller as claimed in claim 1, wherein said flow paths provided on the valve body are comprised the inlet flow path (2) and the outlet flow path (3) which are arranged on the identical axis line.

3. The fluid controller as claimed in claim 1, wherein said flow path provided on the valve body is a T-letter shaped flow path comprising a penetration flow path (12) penetrating the valve body and a branch flow path (13) branched from the penetration flow path and a bottom surface of the penetration flow path exists at the same level as a bottom surface of the communication path.

4. The fluid controller as claimed in claim 1, wherein said flow path provided on the valve body is a T-letter shaped flow path comprising a penetration flow path penetrating the valve body and a branch flow path branched from the penetration flow path, the penetration flow path is where a central axis line thereof is positioned below a bottom of said communication path, and a communication surface (14) from the penetration flow path to the communication path is formed as an inclination horizontally or downward when the penetration flow path is arranged horizontally and the branch flow path is arranged downward.

5. The fluid controller as claimed in claim 4, wherein the diameter of said penetration flow path is larger than the diameter of the branch flow path.

* * * * *